July 8, 1958 E. LAMMERZ ET AL 2,842,004
DOUBLE CLUTCH
Filed Aug. 17, 1954
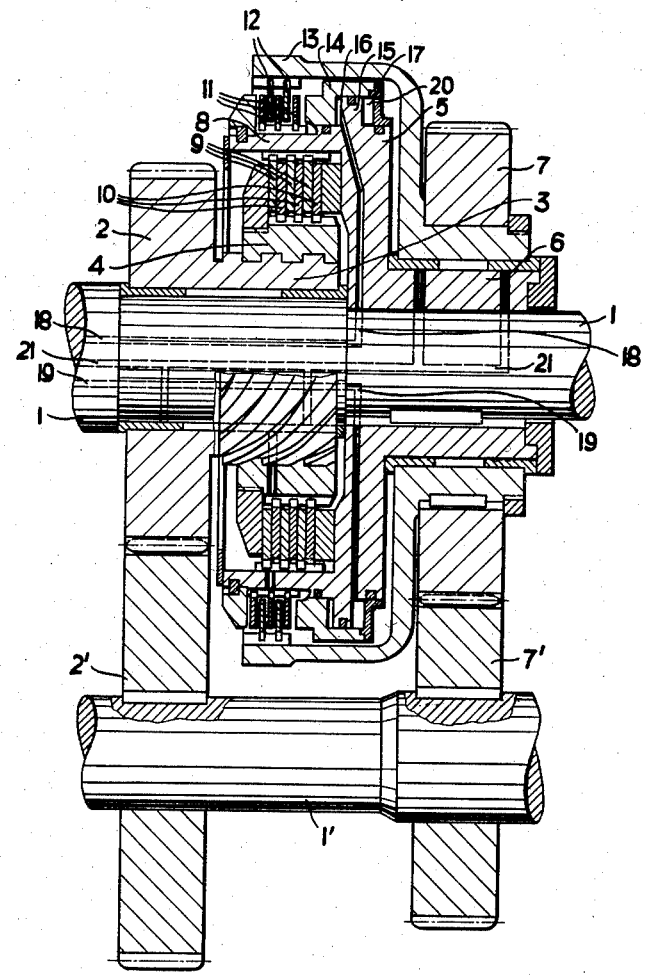
INVENTORS:
Ernst Lammerz
and
Hugo Rambausek
By
Patent Agent United States Patent Office 2,842,004
Patented July 8, 1958

2,842,004

DOUBLE CLUTCH

Ernst Lammerz and Hugo Rambausek, Essen, Germany, assignors to Aktiengesellschaft für Unternehmungen der Eisen- und Stahlindustrie, Essen, Germany Application August 17, 1954, Serial No. 450,424

Claims priority, application Germany August 24, 1953

8 Claims. (Cl. 74—368)

The present invention concerns a double clutch for two gears rotatably mounted on a shaft and adapted alternately to be coupled with said shaft, preferably for use in connection with a multi-velocity shiftable transmission arranged subsequent to a torque converter in a hydraulic fluid drive for vehicles.

In such clutches it is customary to use multi-disc clutches as component clutches and to arrange them axially one behind the other on the clutch shaft. Such arrangement has the drawback that the clutch shaft, and, consequently, also the transmission casing, will require an undesired length, especially when the clutch shaft simultaneously serves as the turbine shaft of the preceding torque converter.

It is, therefore, an object of this invention to provide a double clutch of the character set forth in the preceding paragraph, which will make it possible to reduce considerably the overall length of the clutch over heretofore known similar double clutch arrangements.

It is another object of this invention to provide a double clutch of the above-mentioned character which will improve and facilitate the cooling thereof.

These and other objects and advantages of the invention will appear more clearly from the following specification in connection with the accompanying drawing showing an axial longitudinal section through a double clutch according to the invention.

General arrangement

According to the present invention, the component clutches making up the double clutch are arranged radially one above the other instead of axially one behind the other. The increase in diameter of the clutch resulting therefrom can easier be dealt with, especially in the above-mentioned case in which the clutch shaft also represents the turbine shaft of the torque converter, because due to the diameter of said torque converter, a certain minimum distance from the adjacent transmission shaft will be necessary anyhow. If, as is known per se, one component clutch, for instance, the component clutch for the lower velocity range of the multi-velocity shiftable transmission, is designed as an overrunning clutch and the other component clutch is designed as a shiftable clutch, it is preferable to surround the overrunning clutch by the shiftable clutch in an annular manner.

According to a further development of the invention, both component clutches are designed as multi-disc clutches, the arrangement being such that the disc packets in the overrunning clutch are, through the intervention of a screw thread, adapted automatically to be pressed against each other, while the disc packets in the shiftable clutch are adapted to be acted upon by the pressure of a pressure fluid means. Such an arrangement has the further advantages that the discs of the shiftable clutch afford a good heat emission due to their outer position, and that the relative circumferential velocity in the respective disengaged and idling disc packets are uniformly distributed inasmuch as the overrunning clutch, which customarily has the higher relative speed of rotation, is now of a smaller diameter than the shiftable clutch which, on the other hand, has a lower relative speed of rotation.

The double clutch according to the invention will be particularly space saving in axial direction if, in conformity with a further development, the hub at the same time serves as running surface for the gear of the shiftable clutch, by means of said hub, a support common to the outer disc of the overrunning clutch and the inner discs of the shiftable clutch being non-rotatably mounted on the shaft and conveying the torque thereupon.

The actuation of the shiftable clutch may be effected by providing an axially movable pressure cylinder with a U-shaped portion which extends around a flange of the common support for the discs in such a manner that a chamber is left on both sides of said flange. This chamber may be alternately supplied with a pressure fluid means. The great inner diameter of the shiftable clutch makes it possible to employ narrow-faced disc rings. If the shiftable clutch, as is always the case with automatic shift, is made effective while in motion, the clutch pressures are, as is known, increased by the centrifugal force of the working means so that only a small oil pressure is required. In order, when disconnecting the shiftable clutch, to make the dynamic forces ineffective, the corresponding side of the pressure cylinder is to be provided with a bleeder opening, the cross-section of which is smaller than the bore through which the working means is supplied.

Finally, lubrication and, if desired, cooling are very simple and can effectively be obtained by causing a single oil stream to pass through the screw thread of the overrunning device as well as through the disc packet of one component clutch and thereafter through the disc packet of the other component clutch, said single oil stream being supplied through bores in the shaft and being discharged at the outer circumference of the clutch. The first mentioned cold oil stream serves to lubricate the screw thread and the disc packet of the overrunnning device in which, as is known, no friction heat occurs, and then serves for lubricating and cooling the shiftable clutch. Preferably, the discs are provided with grooves which allow the oil stream to pass even when the individual disc packets are in compressed condition.

Structural arrangement

Referring now to the drawing in detail, the arrangement shown therein comprises a shaft 1, which may be driven by the turbine shaft of a torque converter (not shown in the drawing) or may represent an extension thereof. Rotatably mounted on the shaft 1 is a gear 2 with a hub 3. The outside of the hub 3 is provided with a screw thread carrying a nut 4 with corresponding inner thread. Furthermore, a body or supporting member 5 is keyed to shaft 1. On the hub portion 6 of the body 5 there is rotatably mounted a second gear 7 of larger pitch diameter than that of gear 2. A cylindrical annular member or flange 8 of the body 5 carries on the inside thereof discs 9 which, together with counter-discs 10 arranged on the outside of the nut 4, form an overrunning device or clutch. On the outside of the body 5 there are provided discs 11 while counter-discs 12 are carried by a support 13 connected to the second gear 7. The discs 11 and 12 and a pressure cylinder 14 form the shiftable clutch, said pressure cylinder 14 having a U-shaped portion which surrounds a flange 15 of the body 5 so as to provide a chamber 16 and 17 on both sides of the flange 15. The shaft 1 and the body 5 are provided with conduits 18 and 19 extending therethrough and serving for alternately supplying pressure fluid means such as oil under pressure to and discharging said fluid means from the said chamber. Furthermore, that side of the pressure cylinder which is adjacent the chamber 17 is provided with a bleeder opening 20 having a smaller cross-section than the conduit 19. The central bore 21 in shaft 1 and the transverse bores branching off therefrom serve for lubricating the bearings for the two freely rotatable gears 2 and 7. As will be evident from the drawing, gears 2 and 7 respectively mesh with gears 2′ and 7′ which are keyed to a counter-shaft 1′.

The operation of the illustrated clutch is as follows: In the low velocity range, which corresponds to the position of the individual parts shown in the drawing, conduit 19 and thus chamber 17 are under oil pressure, whereas no pressure prevails in conduit 18 and chamber 16. The cylinder 14 is thus moving toward the right, and the shiftable clutch 11, 12 is disengaged, which means that the gear 7 is declutched. Due to the friction in the disc packet 9, 10 of the overrunning clutch, which friction is also present to a minor extent when the clutch is disengaged, the nut 4 is carried along by the body 5 keyed to shaft 1. Therefore, as soon as shaft 1 overtakes gear 2, also nut 4 will run faster than the hub 3 of gear 2. Consequently, the thread of nut 4 will then screw toward the right, thereby compressing the disc packet 9, 10 and establishing clutch connection. The second gear 7 will in this velocity range run idle at a lower speed of rotation.

In order to throw in the higher velocity range, which may be done at random or automatically, the conduit 19 is relieved from oil pressure, and oil pressure is supplied to conduit 18. The cylinder 14 will then move toward the left, the shiftable clutch 11, 12 will thus be made effective and, consequently, the second gear 7 will be coupled to shaft 1 through the disc support 13. The first gear 2 which, as will be obvious, now idles at a higher speed of rotation, moves the nut 4 toward the left until the discs of the disc packet 9, 10 are loosened, and the nut 4 can synchronously rotate with the gear 2.

It is, of course, understood that the present invention is, by no means, limited to the particular construction shown in the drawing but also comprises any modifications within the scope of the appended claims.

What we claim is:

1. In combination in a double clutch: a rotatable shaft, a first gear freely rotatably supported by said shaft and provided with a threaded collar, an overrunning clutch comprising a plurality of discs and a disc-supporting member engaging the thread of said collar, said discs being arranged for selectively engaging or disengaging each other depending on the relative movement between said threaded collar and said disc-supporting member to thereby selectively drivingly connect or disconnect said first gear and said shaft, a shiftable clutch comprising a plurality of discs surrounding said overrunning clutch, fluid operable means operable selectively for causing the discs of said shiftable clutch selectively to engage or disengage each other, a second gear arranged for driving connection with said shiftable clutch for selectively drivingly connecting or disconnecting said shaft with said second gear, and a gear train drivingly connecting said first gear with said second gear.

2. A double clutch according to claim 1, in which said double clutch is designed so that the discs for the overrunning clutch can be subjected to pressure customary for holding clutches and considerably higher than the pressure permissible to act upon the discs of said shiftable clutch.

3. In combination in a double clutch: a rotatable shaft, a first gear freely rotatably mounted on said shaft and provided with a threaded collar, a first supporting member threadedly engaging said threaded collar, a first set of friction discs supported by said first supporting member, a second supporting member drivingly connected to said shaft and provided with an annular extension of hollow cylindrical form surrounding said first supporting member, said extension being provided with inside and outside disc-engaging means, a second set of friction discs engaged by the inner disc-engaging means of said annular extension and arranged for selective cooperation with said first discs in response to the relative movement between said first supporting member and said threaded collar, a third set of friction discs engaged by the outer disc-engaging means of said annular extension, a second gear freely rotatably supported by said second supporting member and having an extension surrounding said third sets of discs, a fourth set of discs supported by said last mentioned extension and arranged for cooperation with said third set of discs, fluid operable means arranged for cooperation with said third and fourth set of discs and operable selectively to bring about frictional engagement of said last mentioned third and fourth set of discs, and gear train means drivingly connecting said first gear with said second gear.

4. A double clutch according to claim 3, in which said second supporting member has a hub serving as running surface for said second gear.

5. In combination in a double clutch: a rotatable shaft, a first gear supported by said shaft and rotatable about said shaft, said gear having a threaded collar, a first disc-supporting member provided with a thread meshing with said threaded collar and movable in the thread of said collar, first disc means supported by said first supporting member, a second disc-supporting member rotatable about said shaft, a second gear connected to said second disc-supporting member, second disc means supported and rotatable by said second disc-supporting member, third disc means arranged for cooperation with said first disc means, fourth disc means arranged for cooperation with said second disc means, a third disc-supporting member arranged to support and rotate both said second and said fourth disc means and drivingly connected to said shaft, said second and said fourth disc means surrounding said first and said third disc means, said third disc-supporting member being provided with a radially extending flange, a pressure fluid operable cylinder surrounding said radially extending flange so as to form a fluid-receiving chamber on two opposite sides of said flange, conduit means for supplying pressure fluid to either one of said chambers for selectively compressing or releasing pressure on said second and fourth disc means to thereby selectively effect or interrupt driving connection between said shaft and said second gear, and gear train means drivingly connecting said first gear with said second gear.

6. A double clutch according to claim 5, in which the wall of that chamber which is operable to release the pressure from said second and fourth disc means is provided with a bleeder opening, the cross section of said bleeder opening being smaller than the cross section of said conduit means.

7. In combination in a double clutch: a rotatable shaft, a first gear freely rotatably mounted about said shaft and having a threaded collar, a second gear freely rotatably mounted about said shaft, a first component clutch associated with said first gear and comprising a threaded member meshing with said threaded collar and also comprising first discs means operable selectively to be compressed or relieved for effecting or interrupting driving connection between said shaft and said first gear, a second component clutch arranged coaxially with and surrounding said first component clutch and comprising second disc means operable selectively to be compressed or relieved for effecting or interrupting driving connection between said shaft and said second gear, bearing means for said gears and said threaded member, fluid supply and discharge means extending through said shaft to said bearing means and said disc means for successively circulating fluid to said bearing means, said threaded member and all of said disc means, and gear train means drivingly connecting said first gear with said second gear.

8. A double clutch according to claim 1, in which said first gear is provided with a helical thread in such a manner that the axial thrust occurring in clutched condition in said overrunning clutch acts counter to the reaction force brought about by the thread pressure in said overrunning clutch.

References Cited in the file of this patent

UNITED STATES PATENTS

| | | |
|---|---|---|
| 2,055,081 | Jacobs | Sept. 22, 1936 |
| 2,380,390 | Banker | July 31, 1945 |
| 2,614,396 | Raterman | Oct. 21, 1952 |
| 2,690,248 | McDowall | Sept. 28, 1954 |

FOREIGN PATENTS

| | | |
|---|---|---|
| 706,208 | Great Britain | Mar. 24, 1954 |